United States Patent
Tiemann et al.

(10) Patent No.: US 9,383,184 B2
(45) Date of Patent: Jul. 5, 2016

(54) INDUCTIVE POSITION-MEASURING DEVICE

(71) Applicant: DR. JOHANNES HEIDENHAIN GMBH, Traunreut (DE)

(72) Inventors: Marc Oliver Tiemann, Salzburg (AT); Martin Heumann, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 434 days.

(21) Appl. No.: 14/105,859

(22) Filed: Dec. 13, 2013

(65) Prior Publication Data
US 2014/0167746 A1 Jun. 19, 2014

(30) Foreign Application Priority Data
Dec. 13, 2012 (DE) .......................... 10 2012 223 037

(51) Int. Cl.
| | |
|---|---|
| G01B 7/14 | (2006.01) |
| G01B 7/00 | (2006.01) |
| G01D 5/20 | (2006.01) |
| G01D 5/245 | (2006.01) |
| G01B 7/30 | (2006.01) |

(52) U.S. Cl.
CPC ........ *G01B 7/003* (2013.01); *G01B 7/30* (2013.01); *G01D 5/2053* (2013.01); *G01D 5/2451* (2013.01)

(58) Field of Classification Search
USPC ............ 324/207.15, 207.16, 207.17, 207.19, 324/207.24, 207.25, 173; 318/661; 341/15; 33/534, 706, 1 PT, 1 N
See application file for complete search history.

(56) References Cited

U.S. PATENT DOCUMENTS

| | | | |
|---|---|---|---|
| 5,886,519 A | 3/1999 | Masreliez et al. | |
| 7,439,734 B2 | 10/2008 | Fischer | |
| 7,470,890 B2 | 12/2008 | Schroter et al. | |
| 2011/0068777 A1* | 3/2011 | Tiemann ............. | G01D 5/2053 324/207.15 |

FOREIGN PATENT DOCUMENTS

| | | |
|---|---|---|
| DE | 197 01 319 | 7/1998 |
| EP | 1 750 101 | 2/2007 |
| EP | 1 959 240 | 8/2008 |
| JP | 2009-222496 | 10/2009 |

OTHER PUBLICATIONS

European Search Report, completed on Mar. 24, 2014, issued in corresponding European Patent Application No. 13184899.6.

* cited by examiner

*Primary Examiner* — Minh Phan
(74) *Attorney, Agent, or Firm* — Kenyon & Kenyon LLP

(57) ABSTRACT

An inductive position-measuring device includes a scanning element and a graduation element that are movable relative to each other in a first direction. The scanning element includes exciter conductors and three receiver tracks. The first and the second receiver track are disposed at a distance relative to each other, and the third receiver track is located between the first and the second receiver track. The graduation element includes two graduation tracks which are disposed at a distance relative to each other, and which have different graduation periods. Furthermore, electromagnetic fields generated by the exciter conductors are able to be modulated by the graduation tracks, so that a relative position in the first direction is detectable by the first and the second receiver track, while a relative position in a second direction, which is oriented orthogonally with respect to the first direction, is detectable by the third receiver track.

19 Claims, 4 Drawing Sheets

INDUCTIVE POSITION-MEASURING DEVICE

CROSS-REFERENCE TO RELATED APPLICATIONS

The present application claims priority to Application No. 10 2012 223 037.8, filed in the Federal Republic of Germany on Dec. 13, 2012, which is expressly incorporated herein in its entirety by reference thereto.

FIELD OF THE INVENTION

The present invention relates to an inductive position-measuring device for determining relative positions.

BACKGROUND INFORMATION

Inductive position-measuring devices are used, for example, as rotary encoders to determine the angular position of two machine parts rotatable relative to each other. In inductive position-measuring devices, excitation coils and receiver coils are often applied, for instance, in the form of printed conductors on a shared printed circuit board that is joined firmly to a stator of a rotary encoder, for example. Situated opposite this printed circuit board is a graduation element, on which electrically conductive and non-conductive surfaces or bars and gaps, alternating at periodic intervals, are applied as graduation structure, and which is joined in rotatably fixed fashion to the rotor of the rotary encoder. When an electric excitation current changing over time is applied to the excitation coils, signals which are a function of the angular position are generated in the receiver coils during the relative rotation between rotor and stator. These signals are then further processed in evaluation electronics.

In addition, inductive position-measuring devices are also used frequently for the direct measurement of longitudinal displacements along an axis. In so doing, the same measuring principle is used as for the rotary encoders indicated above, however, the receiver coils and the graduation structure then extend along the straight-line axis.

Inductive position-measuring devices of this type are often used as measuring devices for electric drives to determine the relative movement or the relative position of corresponding machine parts. In this case, the position values generated are supplied to sequential electronics for controlling the drives via a suitable interface configuration.

European Patent No. 1 750 101 describes an angle-measuring device, in which, in addition to measuring the angular position, an axial displacement is determinable as a function of a measured temperature.

SUMMARY

Example embodiments of the present invention provide an inductive position-measuring device which makes it possible to easily determine a displacement with a direction perpendicular to the actual measuring direction.

According to example embodiments of the present invention, an inductive position-measuring device has a scanning element and a graduation element, the scanning element being movable in a first direction in linear or rotatory fashion relative to the graduation element. The scanning element includes exciter conductors for generating electromagnetic fields and three receiver tracks, each having at least one receiver conductor. The first and second receiver tracks are disposed relative to each other at a distance which extends orthogonally with respect to the first direction. The third receiver track is located between the first and second receiver tracks. In addition, the graduation element includes two graduation tracks that are disposed relative to each other at a distance which extends orthogonally with respect to the first direction, and that have different graduation periods along the first direction. Furthermore, the position-measuring device is configured such that electromagnetic fields generated by the exciter conductors are able to be modulated by the graduation tracks, so that a relative position in the first direction is detectable by the receiver conductors of the first and second receiver tracks, while a relative position in a second position which is oriented orthogonally with respect to the first direction is detectable by the at least one receiver conductor of the third receiver track.

A graduation period is a geometrical length which is determined by the graduation structure. For example, in each case, exactly one conductive and one non-conductive surface or exactly one bar and one gap are located within one graduation period. One signal period is generated by the scanning element upon sweeping over one graduation period.

To be understood as tracks, e.g., especially the exciter track, the first, second and third receiver tracks as well as the graduation track, are geometrical areas that extend along the first direction and have an extension in the second direction. In the case of an angle-measuring device, a track may be viewed as a rectangular surface which extends along the circumference and, in particular, may be endless in the first direction. In the case of position-measuring devices for measuring a translatory relative position, a track may have a rectangular geometry. The first, second and third receiver tracks may have receiver conductors extending over the entire measuring length or the entire circumference, or only sectionally or segment-wise. In particular, the position-measuring device may be arranged such that the receiver conductor is disposed with an offset in the first direction relative to a receiver conductor of at least one of the other receiver tracks.

Usually, the scanning element and the graduation element are disposed opposite each other and are set apart from each other by an air gap that extends in a third direction which is oriented orthogonally with respect to the first and the second direction. The device described herein does not relate to the detection of the width of the air gap. The relative movement may be a rotational movement or a linear movement. Correspondingly, the relative position may be an angular position or a translatory position. Due to the different graduation periods, with the aid of suitable signal-evaluation processes, e.g., according to the vernier principle, an absolute relative position is able to be determined between the scanning element and the graduation element.

In particular, the inductive position-measuring device is arranged such that the first receiver track and the second receiver track having receiver conductors are disposed on the scanning element. The graduation element includes the first graduation track and the second graduation track, the position-measuring device being configured such that in response to identical relative movement between the scanning element and the graduation element, a greater number of signal periods is able to be generated by the receiver printed conductors of the first receiver track than by the receiver printed conductors of the second receiver track. Identical relative movements are understood to be relative movements of equal size, for example, a relative rotation about a specific measure of angle or a longitudinal displacement by a specific measure of length.

At least one of the receiver tracks may have at least two receiver conductors.

At least one of the graduation tracks may include a graduation structure that has electrically conductive and non-conductive areas disposed in alternating fashion along the first direction.

The inductive position-measuring device may also be configured such that at least one of the graduation tracks is made of a graduation structure which has bars and gaps alternating along the first direction. The graduation tracks may also be implemented as plated metallic layers.

Particularly if the position-measuring device is intended to determine angular positions, the graduation element may have a curved lateral surface on which the graduation tracks are disposed at an axial distance, e.g., are offset axially in relation to the axis about which the rotation is to take place. For example, the first receiver track or the second receiver track has at least one receiver conductor which extends along the first direction over an angle of more than 180°, especially of more than 225°, and more specifically with an angle of at least 270°. The angle specifications relate to a central angle having a central point on the axis about which the graduation element is to rotate relative to the scanning element.

Likewise, the receiver conductor or receiver conductors of the third receiver track may extend along the first direction over an angle of more than 180°, especially of more than 225°, and more specifically of at least 270°.

The receiver conductor of the third receiver track may also be arranged such that it has interruptions along the first direction. Correspondingly, the graduation tracks over the circumference may thus be scanned at a plurality of locations. For example, locations at which the graduation tracks may be scanned, e.g., at which at least one receiver conductor of the third receiver track is located, are situated opposite in terms of one central point on the axis. In the case of such an arrangement, the receiver conductors of the third receiver track may in each case extend over a central angle of at least 60°, e.g., at least 75°, or of at least 100°, with a central point on the axis.

Due to the relatively great length of the receiver conductors, the signals generated exhibit a high degree of insensitivity to errors in eccentricity and wobble errors. As a result, relatively great manufacturing and assembly tolerances may be allowed.

The scanning element may also be arranged such that the first, second or third receiver track has a plurality of segments, so that one receiver track and optionally also the exciter conductors are quasi interrupted along the first direction. In this case, at least one receiver conductor may be disposed within the segments, while no receiver conductor is present outside of the segments along the first direction.

For example, in the case of a position-measuring device intended to determine angular positions, at least the third receiver track may have receiver conductors distributed in a segment-wise manner over the circumference, in which case the area of a receiver conductor may extend over an angle segment of in each case less than 30° (e.g., 1/12 of the total circumference), particularly less than 15° (e.g., 1/24 of the total circumference). For example, in the case of such an arrangement of a position-measuring device, by which angular positions are intended to be determinable in relation to a (rotational) axis, the individual segments are disposed centrosymmetrically relative to one point on the axis.

The graduation element may have a flat plane on which the graduation tracks are disposed. Such an arrangement may be provided in connection with the measurement of translatory movements or positions.

At least one of the exciter conductors may be adapted to generate an electromagnetic field by which, after it has been modulated by the graduation element, both (a) a relative position in the first direction is detectable by the receiver conductor of the first and the second receiver track, and (b) a relative position in a second direction is detectable by the receiver conductor of the third receiver track.

Accordingly, it is possible to dispense with a separate or additional exciter conductor for the generating of signals by the receiver conductor of the third receiver track.

Next to two of the receiver tracks, in each case, an exciter conductor may be arranged at least sectionally on both sides relative to the second direction, which is oriented orthogonally with respect to the first direction and not in the direction of the air gap. In particular, the scanning element may be arranged such that next to all three receiver tracks, in each case, an exciter conductor is located at least sectionally on both sides relative to the second direction. For example, two exciter conductors are disposed at least sectionally between the first and the second receiver track. In particular, exciter conductors are located on both sides of a receiver conductor.

The relation of the graduation period of the first graduation track to the graduation period of the second graduation track may lie within a range of 1/4 to 4. In particular, the relation may amount to a minimum of 1/3 and a maximum of 3. For example, the relation lies within a range of 1/2 to 2. For example, in the case of a position-measuring device which is intended to measure angular positions, the number of graduation periods of the first graduation track may differ by the value one compared to the number of graduation periods of the second graduation track.

The two graduation tracks have different graduation periods. Accordingly, there is thus one graduation track having a longer graduation period and one graduation track having a shorter graduation period. Advantageously, the third receiver track extends along the first direction over a length which is greater than the longer of the graduation periods.

Further features and aspects of example embodiments of the present invention are described in more detail below with reference to the appended Figures.

DETAILED DESCRIPTION

Figure 1:
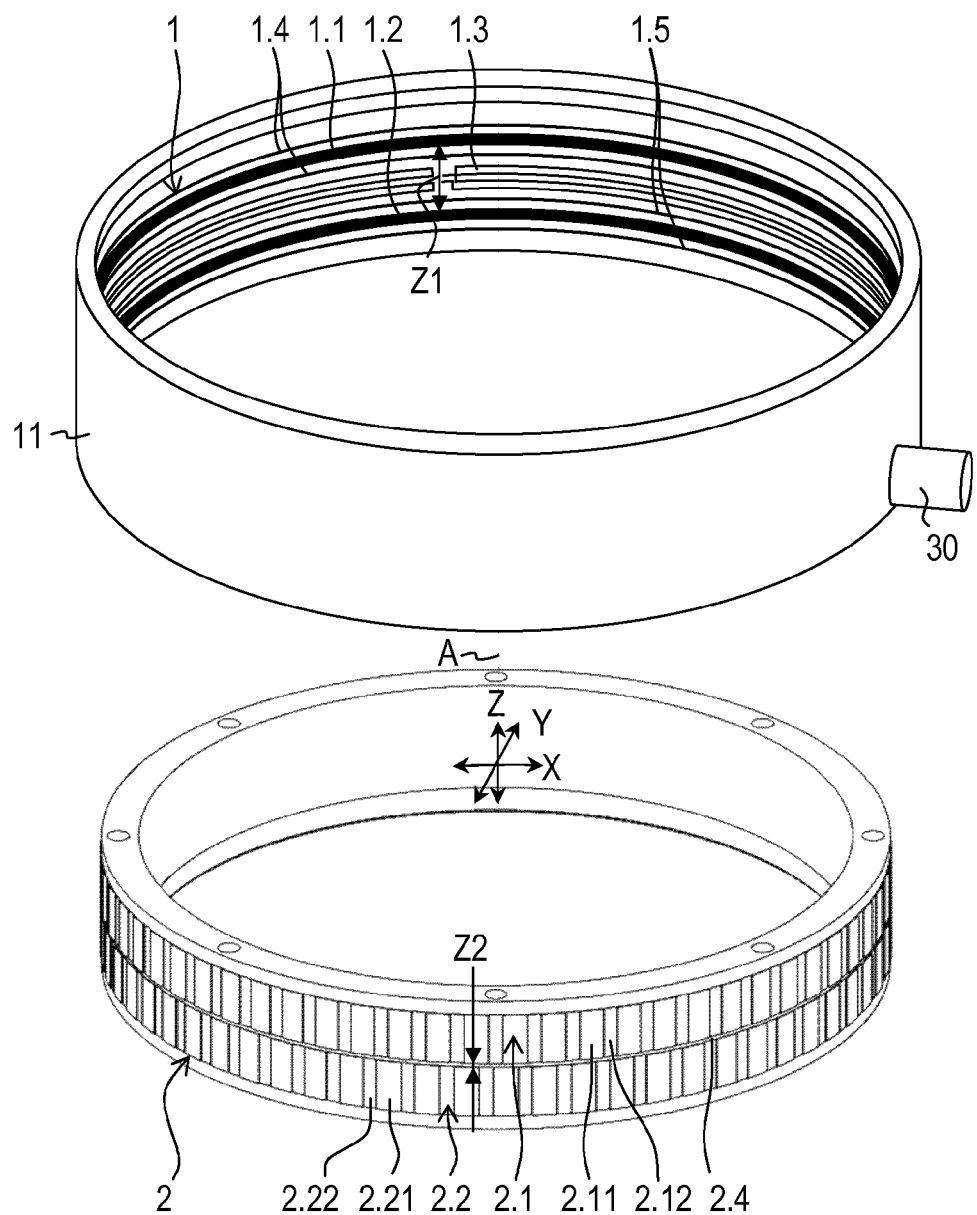
FIG. 1 is a perspective view of a position-measuring device for determining a relative angular position.
Figure 2:
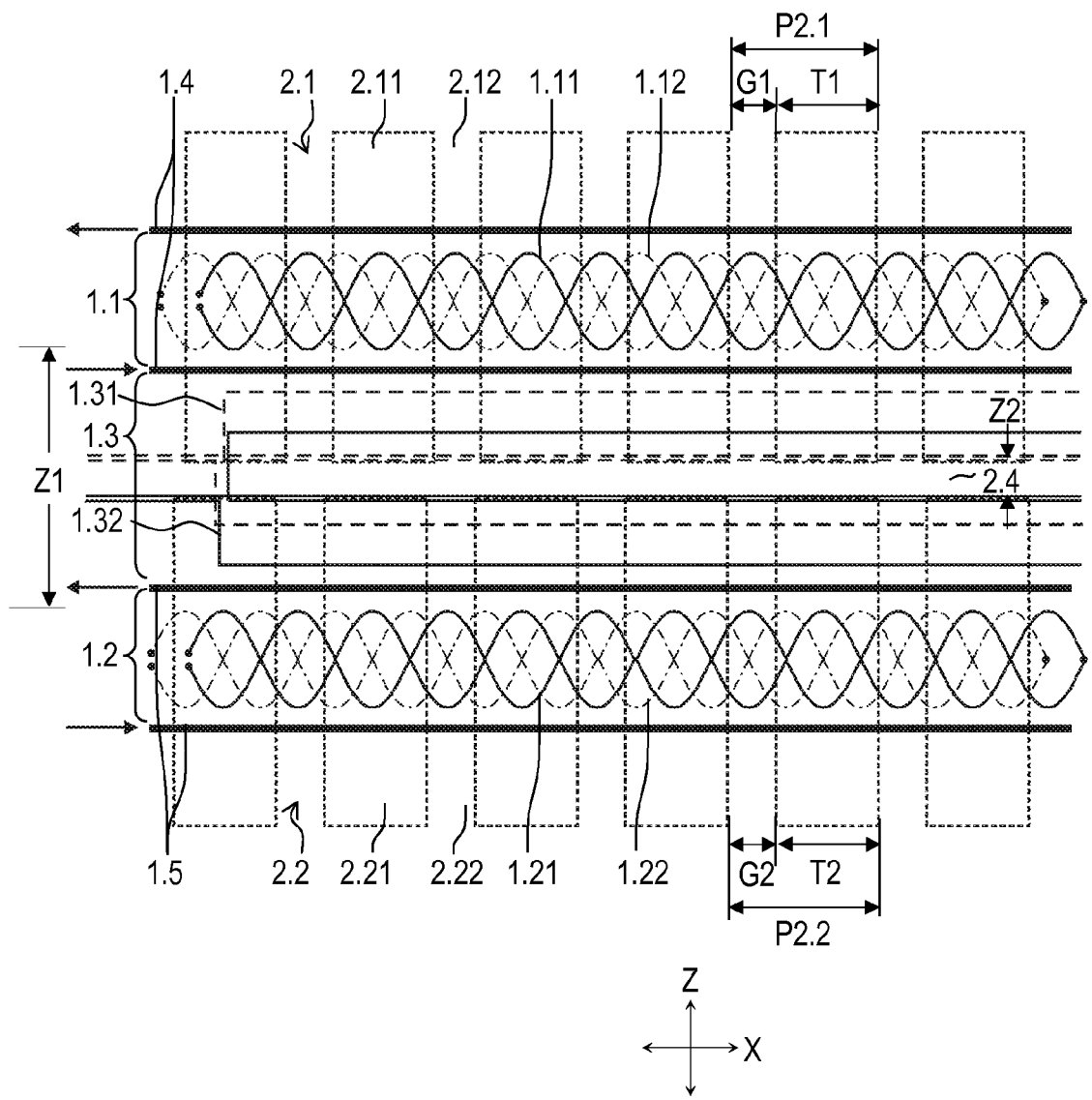
FIG. 2 is a plan view of a partial area of a scanning element.

A position-measuring device is illustrated in FIGS. 1 and 2 and is intended to detect an angular position between a scanning element 1 and a graduation element 2, i.e., a graduated scale. For the purpose of clarifying the construction, scanning element 1 and graduation element 2 are shown separated in FIG. 1. In the state appropriate for operation, scanning element 1 and graduation element 2 are arranged concentrically opposite each other with radial air gap.

In this exemplary embodiment, graduation element 2 is in the form of a ring, on whose lateral side, two graduation tracks 2.1, 2.2 are located, disposed at a distance Z2. In the example shown, graduation tracks 2.1, 2.2 include bars 2.11, 2.21 and gaps 2.12, 2.22 in between, first graduation track 2.1 having sixty-four such bars 2.11, while second graduation track 2.2 includes only sixty-three bars 2.21. Illustratively, a circumferential groove 2.4 having axial extension Z2 is located between bars 2.11, 2.21.

Accordingly, the two graduation tracks 2.1 2.2, in each case, include a periodic succession of alternating bars 2.11, 2.21 and gaps 2.12, 2.22.

First graduation period P2.1 of first graduation track 2.1 is derived from the sum of length T1 of one of bars 2.11 and length G1 of one of gaps 2.12, lengths T1, G1 extending in direction X. Likewise, second graduation period P2.2 represents the sum of length T2 of one of bars 2.21 and length G2 of one of gaps 2.22 from second graduation track 2.2. Both graduation tracks 2.1, 2.2 are dimensioned such that the following relationship applies: T1/G1≈T2/G2.

Particularly along a first direction X, e.g., in the circumferential direction, graduation tracks 2.1, 2.2 have different graduation periods P2.1, P2.2 (See, e.g., FIG. 2), for example:

$$P2.1 = \text{circumference}/64;\ \text{and}$$

$$P2.2 = \text{circumference}/63.$$

Accordingly, the relationship of graduation period P2.1 of first graduation track 2.1 to graduation period P2.2 of second graduation track 2.2 is formed in the following manner:

$$\begin{aligned} P2.1:P2.2 &= (\text{circumference}/64):(\text{circumference}/63) \\ &= 63/64 \\ &\approx 0.984. \end{aligned}$$

Scanning element 1 includes an annularly disposed, flexible printed circuit board, on which two exciter conductors 1.4, 1.5 and three receiver tracks 1.1, 1.2, 1.3 are located. Both exciter conductors 1.4, 1.5 and receiver tracks 1.1, 1.2, 1.3 extend along direction X, that is, along the circumferential direction, and specifically, over nearly the entire circumference of scanning element 1. A complete extension over the entire circumference may not readily be able to be produced, or may only be producible with increased expenditure, because terminal areas for exciter conductors 1.4, 1.5 and receiver tracks 1.1, 1.2, 1.3 are provided on scanning element 1, resulting in a discontinuity, even if only slight. In addition, first and second receiver tracks 1.1, 1.2 are applied on scanning element 1 at a distance Z1 relative to each other. Distance Z1 extends orthogonally relative to first direction X, e.g., relative to the circumferential direction, and in particular, is oriented parallel to distance Z2, i.e., is oriented axially.

Further located on scanning element 1 is a third receiver track 1.3. It is located axially between first and second receiver tracks 1.1, 1.2, and extends in direction X over almost the entire circumference of scanning element 1, with the exception of the terminal area. Exciter conductors 1.4, 1.5 and receiver tracks 1.1, 1.2, 1.3 are arranged as printed conductors of the multilayer flexible printed circuit board which is used as scanning element 1.

Also located on scanning element 1 are an electronic circuit and a connector element. Scanning element 1 is mounted in an annular housing 11 and is connectable to sequential electronics via a cable 30.

FIG. 2 shows a detail section of the three receiver tracks 1.1, 1.2, 1.3 and the two exciter conductors 1.4, 1.5 together with graduation tracks 2.1, 2.2. The first and the second 1.1, 1.2 of the receiver tracks each have a pair of receiver printed conductors 1.11, 1.12; 1.21, 1.22. Third receiver track 1.3 includes two receiver loops 1.31, 1.32, also arranged as printed conductors.

As illustrated in FIG. 2, an exciter conductor 1.4, 1.5 is thus disposed both next to the first and next to the second receiver track 1.1, 1.2 in the Z direction, in each case on both sides. In other words, in a direction (Z direction), which is oriented orthogonally relative to direction X, two exciter conductors 1.4, 1.5 are located between first and second receiver tracks 1.1, 1.2.

In the state appropriate for operation, graduation element 2 is located radially within scanning element 1, without them touching each other. In general, graduation element 2 is used as rotor and is mounted on a machine part rotatable about an axis A. On the other hand, scanning element 1 forms the stator of the position-measuring device, so that it is fixed in position on a stationary machine part. In response to a relative rotation between graduation element 2 and scanning element 1 about axis A, a signal which is a function of the specific angular position is able to be generated by induction effects in scanning element 1.

A prerequisite for the formation of corresponding signals is that exciter conductors 1.4, 1.5 generate an electromagnetic excitation field, changing over time, in the area of receiver tracks 1.1, 1.2, 1.3 and in the area of graduation tracks 2.1, 2.2 scanned by them. In the exemplary embodiment illustrated, exciter conductors 1.4, 1.5 are in the form of a plurality of parallel, individual printed conductors traversed by current. If exciter conductors 1.4, 1.5 are supplied with current, an electromagnetic field oriented in the shape of a tube or cylinder then forms about respective exciter conductors 1.4, 1.5. The field lines of the resulting electromagnetic field extend in the form of concentric circles around exciter conductors 1.4, 1.5, the direction of the field lines being dependent in conventional manner on the current direction in exciter conductors 1.4, 1.5. Eddy currents are induced in the area of bars 2.11, 2.21, so that the field is modulated as a function of the angular position. The relative position in direction X is able to be measured by receiver tracks 1.1, 1.2, accordingly. The pairs of receiver printed conductors 1.11, 1.12; 1.21, 1.22 of a receiver track 1.1, 1.2 are arranged such that they supply signals phase-shifted in each case by 90°, so that the direction of rotation may also be determined. Each of receiver tracks 1.1, 1.2 for determining the position in direction X, e.g., the angular position, is surrounded by a separate exciter conductor 1.4, 1.5.

First, second and third receiver tracks 1.1, 1.2, 1.3 extend around nearly the entire circumference of scanning element 1, e.g., around almost 360° about axis A. Due to this type of construction, precise angle determination may be achieved, even in the case of comparatively great mounting tolerances.

Because the two graduation tracks 2.1, 2.2 have slightly different graduation periods P2.1, P2.2, the absolute angular position of graduation element 2 in relation to scanning element 1 may be determined from the signals of receiver tracks 1.1, 1.2, using the beat or vernier principle.

For example, graduation element 2 may be mounted on a spindle of a machine tool whose rotational position and rotational speed are to be measured primarily. At one end of the rotatable shaft, a tool is mounted whose position must be determined exactly in order to ensure precise processing of a particular workpiece. If such a system is operated over a longer time, in general, heat is introduced into the shaft, e.g., from the drive motor or from the bearings. This leads to a change in length of the shaft in direction Z. The position of the tool is shifted in the Z direction correspondingly. To increase the precision of the machine tool, the value or the magnitude of the change in length is determined and supplied to the numerical control of the machine tool or the sequential electronics for the position correction. Using the position-measuring device described herein, no separate position-measuring device for determining the change in length of the shaft is necessary for this purpose.

The relative position in direction Z between graduation element 2 and scanning element 1 is detected by third receiver track 1.3. The signals generated by receiver loops 1.31, 1.32 are a function of the specific overlapping ratio or contact ratio of respective receiver loops 1.31, 1.32 with groove 2.4. The excitation field necessary for third receiver track 1.3 to obtain the signals for the Z direction is generated by exciter conductors 1.4, 1.5. Thus, the position-measuring device is able to detect a relative position in a second direction Z which is oriented orthogonally with respect to first direction X, using precisely those exciter conductors 1.4, 1.5 which generate electromagnetic fields by which ultimately the one relative position in first direction X is also detectable with the aid of first and second receiver tracks 1.1, 1.2. It is therefore possible to dispense with special exciter conductors for detecting the relative position in the Z direction.

Direction Z is thus a direction which is oriented orthogonally with respect to first direction X, however not radially (not the Y direction), so that the width of the air gap between scanning element 1 and graduation element 2 is thus not used for determining the change in the length of the shaft.

Figure 3:
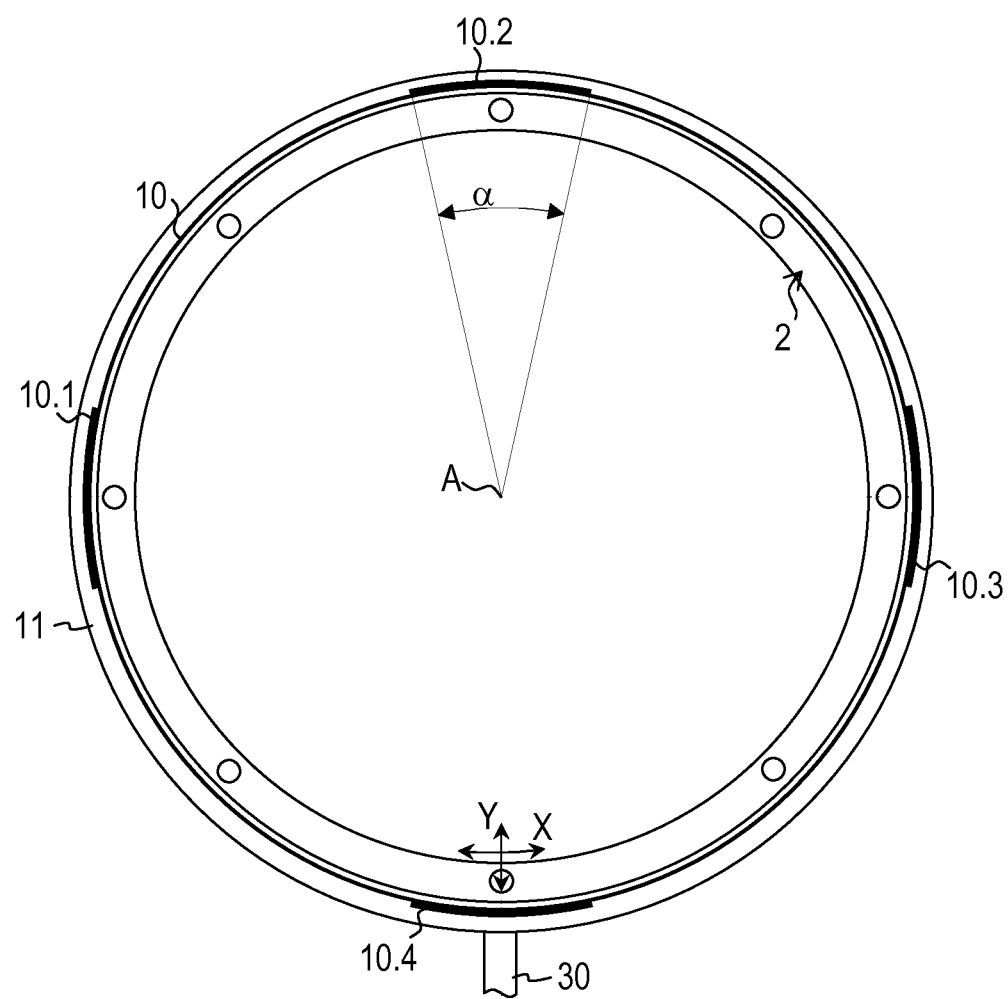
FIG. 3 is a plan view of a position-measuring device for determining a relative angular position.

FIG. 3 illustrates another exemplary embodiment of a position-measuring device, which is also intended for detecting an angular position. The position-measuring device includes an outer annular housing 11 and a graduation element 2. They are implemented in the manner described in more detail above. On the other hand, the position-measuring device has a scanning element 10 which includes four segments 10.1, 10.2, 10.3, 10.4. Like scanning element 1, each of the segments 10.1, 10.2, 10.3, 10.4 has exciter conductors 1.4, 1.5 and three receiver tracks 1.1, 1.2, 1.3, first and second receiver tracks 1.1, 1.2 being disposed relative to each other at a distance Z1 which extends orthogonally with respect to first direction X, e.g., in the Z direction. Third receiver track 1.3 is located between first and second receiver tracks 1.1, 1.2. Therefore, FIG. 2 may also be regarded as a section from one of segments 10.1, 10.2, 10.3, 10.4.

Each of segments 10.1, 10.2, 10.3, 10.4 extends over only a partial area of the circumference of graduation element 2, that is, of the inner circumference of housing 11. In the exemplary embodiment illustrated, each of the four segments 10.1, 10.2, 10.3, 10.4 extends over a central angle α of 24°, so that in total, segments 10.1, 10.2, 10.3, 10.4 extend over only 26.7% (96°) of the circumference.

Particularly in the case of larger diameters of a graduation element, segments 10.1, 10.2, 10.3, 10.4 in total may alternatively extend over substantially less than ¼ of the circumference. As an alternative, two, three or more than four segments 10.1, 10.2, 10.3, 10.4 may also be provided along the circumference.

Segments 10.1, 10.2, 10.3, 10.4 are positioned centrosymmetrically relative to each other in respect to one point on axis A. Such a placement is also considered advantageous if a number other than four segments 10.1, 10.2, 10.3, 10.4 is used.

Figure 4:
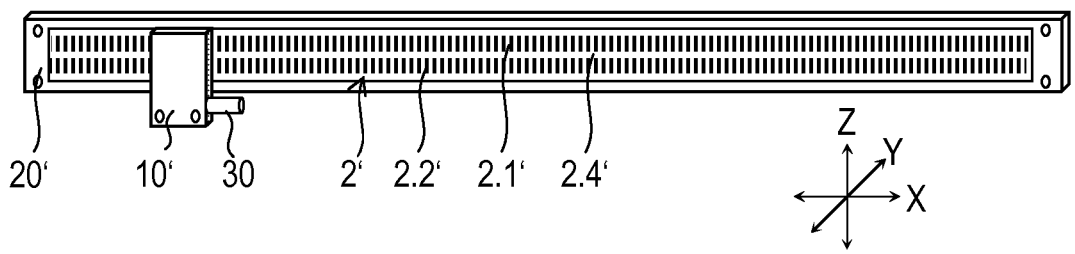
FIG. 4 is a perspective view of a position-measuring device for determining a translatory relative position.
Figure 5A:
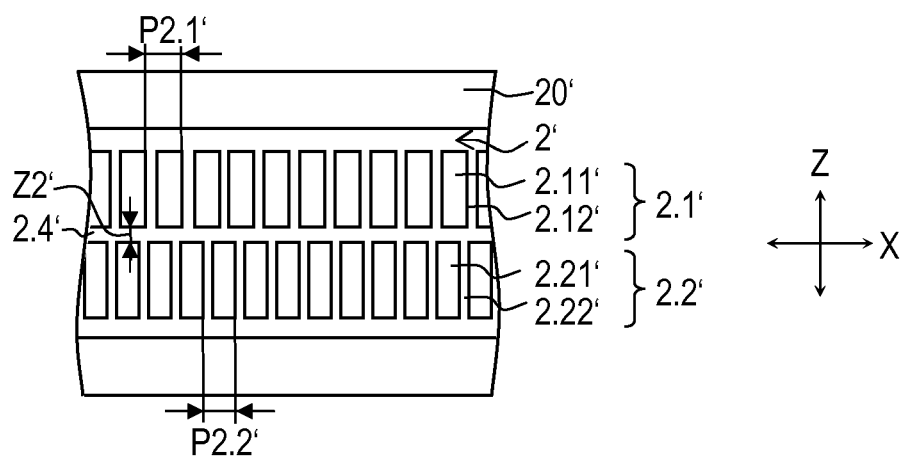
FIG. 5a is a plan view of a partial area of a graduation element of a position-measuring device for determining a translatory relative position.
Figure 5B:
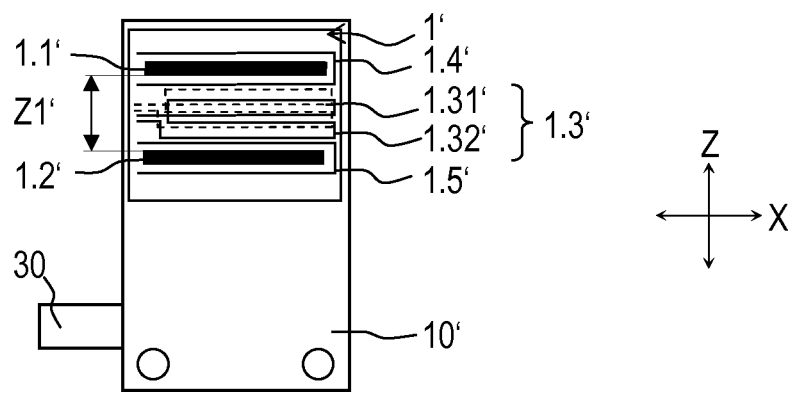
FIG. 5b is a plan view of a partial area of a scanning element of a position-measuring device for determining a translatory relative position.

According to a further exemplary embodiment, which is illustrated in FIGS. 4, 5a and 5b, the position-measuring device may also be used to measure a translatory or linear relative position.

In this exemplary embodiment, graduation element 2' is mounted in a housing 20' and has two graduation tracks 2.1', 2.2'. Each of the two graduation tracks 2.1', 2.2' includes a periodic succession of electrically conductive graduation structures 2.11', 2.21' and non-conductive graduation structures 2.12', 2.22' in alternation. In the example illustrated, copper is applied on a substrate as material for electrically conductive partial areas 2.11', 2.21'. On the other hand, the substrate is not coated in non-conductive graduation structures 2.12', 2.22'. Graduation tracks 2.1', 2.2' have different graduation periods P2.1, P2.2 (see, e.g., FIG. 5a) along first direction X.

Between graduation tracks 2.1', 2.2' is a strip 2.4' having a width Z2', which has no conductive coating whatsoever.

Furthermore, the position-measuring device includes a scanning element 1', which includes a printed circuit board on which two exciter conductors 1.4', 1.5' and three receiver tracks 1.1', 1.2', 1.3' are disposed. First and second receiver tracks 1.1', 1.2' are applied on scanning element 1' at a distance Z1' relative to each other. Distance Z1' extends orthogonally relative to first direction X and in particular, is oriented parallel to distance Z2' or the Z direction.

Also located on scanning element 1' is a third receiver track 1.3'. It is disposed in the Z direction between first and second receiver tracks 1.1', 1.2'. Exciter conductors 1.4', 1.5' and receiver tracks 1.1', 1.2', 1.3' are provided as printed conductors of the multilayer flexible printed circuit board which is used as scanning element 1'.

In addition, an electronic circuit as well as a connector element are located on scanning element 1'. Scanning element 1' is mounted in a housing 10' and is connectable to sequential electronics via a cable 30.

In principle, first and second receiver tracks 1.1', 1.2' are configured analogously to those illustrated in FIG. 2, e.g., in each case, with a pair of receiver printed conductors staggered in sine-like fashion. The two exciter conductors 1.4', 1.5' are provided analogously to those illustrated in FIG. 2. Third receiver track 1.3' is shorter in the X direction than that of the first exemplary embodiment.

If scanning element 1' is moved along graduation element 2' in the X direction, the absolute relative position between them is able to be determined, and in so doing, use is made of the vernier principle, as well. At the same time, the relative position in direction Z between graduation element 2' and scanning element 1' is able to be detected by third receiver track 1.3'. The signals generated by individual receiver loops 1.31', 1.32' are a function of the specific overlapping ratio or contact ratio of respective receiver loops 1.31', 1.32' with uncoated strip 2.4'.

Scanning element 1' and graduation element 2' are thus located opposite each other and are set apart from each other by an air gap that extends in the Y direction. The device described herein does not relate to the detection of the width of the air gap in the Y direction.

Regardless of whether the inductive position-measuring device is implemented as an angle-measuring device or as a length-measuring device, bars and gaps or electrically conductive surfaces and non-conductive surfaces may be used as a graduation structure.

What is claimed is:
1. An inductive position-measuring device, comprising:
a scanning element; and
a graduation element, the scanning element and the graduation element movable relative to each other in a first direction;
wherein the scanning element includes exciter conductors and three receiver tracks, each receiver track having at least one receiver conductor, a first receiver track and a second receiver track arranged relative to each other at a distance that extends orthogonally with respect to the first direction, a third receiver track located between the first receiver track and the second receiver track;

wherein the graduation element including two graduation tracks arranged relative to each other at a distance that extends orthogonally with respect to the first direction, and that have different graduation periods along the first direction;

wherein the graduation tracks are adapted to modulate electromagnetic fields generated by the exciter conductors, a relative position in the first direction detectable by the receiver conductors of the first receiver track and the second receiver track, and a relative position in a second direction that is oriented orthogonally with respect to the first direction detectable by the at least one receiver conductor of the third receiver track.

2. The inductive position-measuring device according to claim 1, wherein at least one of the receiver tracks includes at least two receiver conductors.

3. The inductive position-measuring device according to claim 1, wherein at least one of the graduation tracks includes a graduation structure having electrically conductive and non-conductive areas disposed in alternation along the first direction.

4. The inductive position-measuring device according to claim 1, wherein at least one of the graduation tracks includes a graduation structure having bars and gaps disposed in alternation along the first direction.

5. The inductive position-measuring device according to claim 1, wherein the graduation element has a curved lateral surface, on which the graduation tracks are arranged at an axial distance.

6. The inductive position-measuring device according to claim 5, wherein the first receiver track or the second receiver track has at least one receiver conductor that extends along the first direction over an angle of at least 270°.

7. The inductive position-measuring device according to claim 5, wherein the third receiver track has at least one receiver conductor that extends along the first direction over an angle of at least 270°.

8. The inductive position-measuring device according to claim 1, wherein the graduation element has a flat plane, on which the graduation tracks are provided.

9. The inductive position-measuring device according to claim 1, wherein at least one of the exciter conductors is adapted to generate an electromagnetic field, with which, after being modulated, a relative position in the first direction is detectable by the receiver conductors of the first receiver track and the second receiver track, and a relative position in the second direction is detectable by the receiver conductor of the third receiver track.

10. The inductive position-measuring device according to claim 1, wherein next to each of two of the receiver tracks, an exciter conductor is provided at least sectionally on both sides relative to the second direction that is oriented orthogonally with respect to the first direction.

11. The inductive position-measuring device according to claim 1, wherein two exciter conductors are provided at least sectionally between the first receiver track and the second receiver track.

12. The inductive position-measuring device according to claim 1, wherein a ratio of a graduation period of the first graduation track to a graduation period of the second graduation track is between ¼ and 4.

13. The inductive position-measuring device according to claim 1, wherein the third receiver track has at least one receiver conductor that extends along the first direction over a length that is greater than the longer of a graduation period of the first graduation track and a graduation period of the second graduation track.

14. The inductive position-measuring device according to claim 1, wherein the first receiver track, the second receiver track, or the third receiver track includes segments, within which at least one receiver conductor is located, and no receiver conductor is located outside of the segments along the first direction.

15. The inductive position-measuring device according to claim 1, wherein the segments are positioned centrosymmetrically relative to one point on an axis of relative rotation between the scanning element and the graduation element.

16. The inductive position-measuring device according to claim 1, wherein the inductive position-measuring device is adapted to determine relative rotation between the scanning element and the graduation element.

17. The inductive position-measuring device according to claim 1, wherein the inductive position-measuring device is arranged as an angle-measuring device.

18. The inductive position-measuring device according to claim 1, wherein the inductive position-measuring device is adapted to determine relative linear translation between the scanning element and the graduation element.

19. The inductive position-measuring device according to claim 1, wherein the inductive position-measuring device is arranged as a linear-measuring device.

* * * * *